(12) United States Patent
Saruban

(10) Patent No.: US 11,264,177 B2
(45) Date of Patent: Mar. 1, 2022

(54) METHOD OF MANUFACTURING MULTILAYER CERAMIC CAPACITOR AND MULTILAYER CERAMIC CAPACITOR

(71) Applicant: Murata Manufacturing Co., Ltd., Nagaokakyo (JP)

(72) Inventor: Masahito Saruban, Nagaokakyo (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 31 days.

(21) Appl. No.: 16/908,778

(22) Filed: Jun. 23, 2020

(65) Prior Publication Data

US 2020/0411247 A1 Dec. 31, 2020

(30) Foreign Application Priority Data

Jun. 27, 2019 (JP) .............................. JP2019-120607

(51) Int. Cl.
*H01G 4/30* (2006.01)
*H01G 4/12* (2006.01)
*H01G 4/012* (2006.01)
*H01G 4/248* (2006.01)

(52) U.S. Cl.
CPC .............. *H01G 4/30* (2013.01); *H01G 4/012* (2013.01); *H01G 4/12* (2013.01); *H01G 4/248* (2013.01)

(58) Field of Classification Search
CPC ............ H01G 4/30; H01G 4/12; H01G 4/248; H01G 4/012; H01G 4/1209; H01G 4/232; H01G 4/0085; H01G 4/1227; H01G 4/2325; H01G 4/224; H01G 2/065; H01G 4/008; H01G 4/1218
See application file for complete search history.

(56) References Cited

U.S. PATENT DOCUMENTS

| | | | |
|---|---|---|---|
| 10,366,834 B1* | 7/2019 | Lee | H01G 4/30 |
| 10,770,232 B2* | 9/2020 | Han | H01G 4/2325 |
| 2010/0290172 A1* | 11/2010 | Motoki | H01G 4/2325 361/305 |
| 2018/0082785 A1* | 3/2018 | Asano | H01G 4/30 |
| 2018/0082787 A1* | 3/2018 | Hamamori | H01G 4/005 |
| 2018/0166215 A1* | 6/2018 | Hamanaka | H01G 4/232 |
| 2019/0385795 A1* | 12/2019 | Yang | H01G 4/2325 |

FOREIGN PATENT DOCUMENTS

JP 2003-243249 A 8/2003

* cited by examiner

*Primary Examiner* — Michael P McFadden
(74) *Attorney, Agent, or Firm* — Keating & Bennett, LLP

(57) ABSTRACT

A method includes producing a ceramic body including a stack of a dielectric layer and an internal electrode, applying a conductive paste including metal powder and glass frit to an outer surface of the ceramic body and baking the conductive paste to form a base external electrode layer, forming a crack in glass exposed to an outer surface of the base external electrode layer, after the formation of the crack, applying a water repellent to the base external electrode layer, and forming a Ni plating layer and a Sn plating layer on the base external electrode layer.

18 Claims, 15 Drawing Sheets

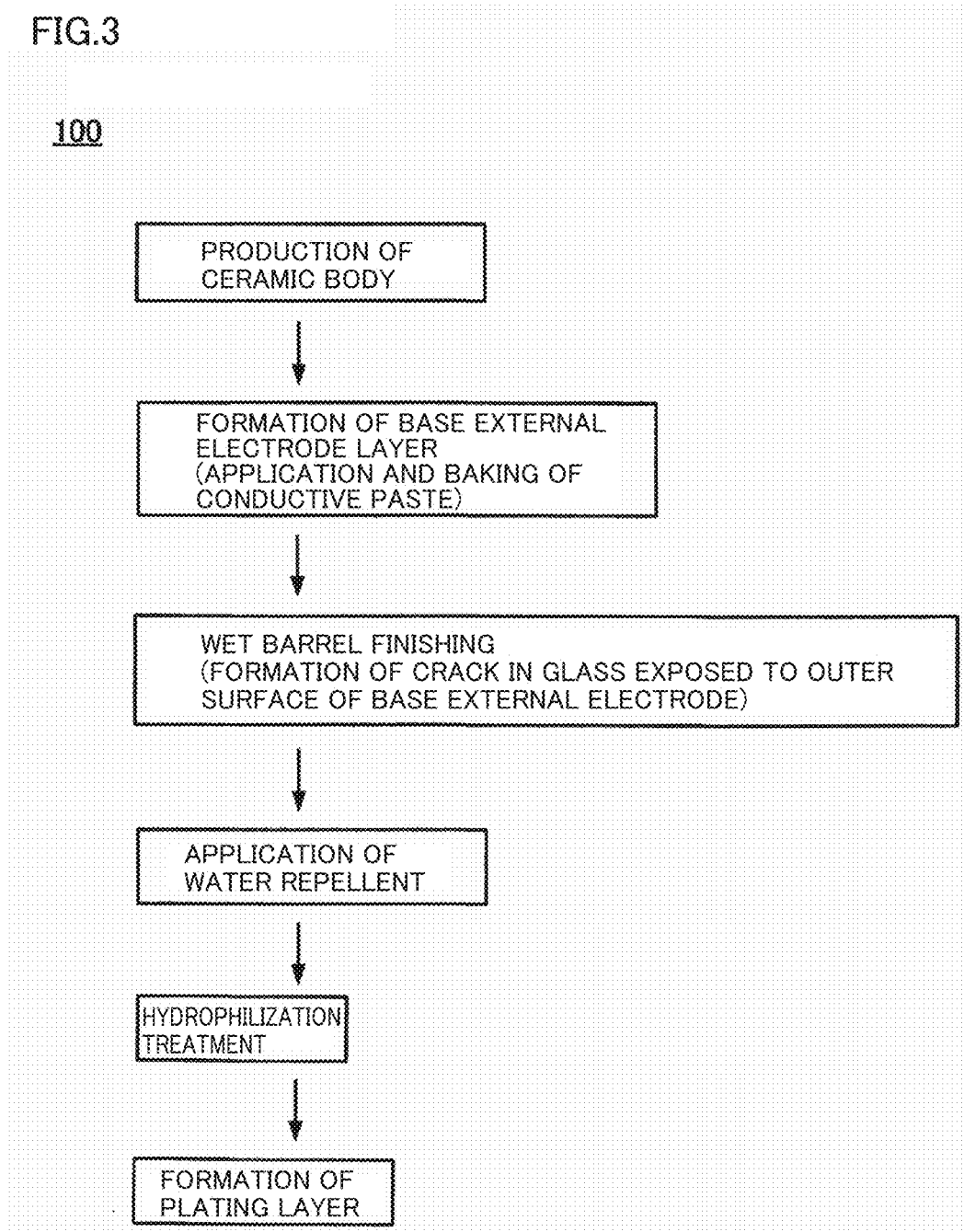

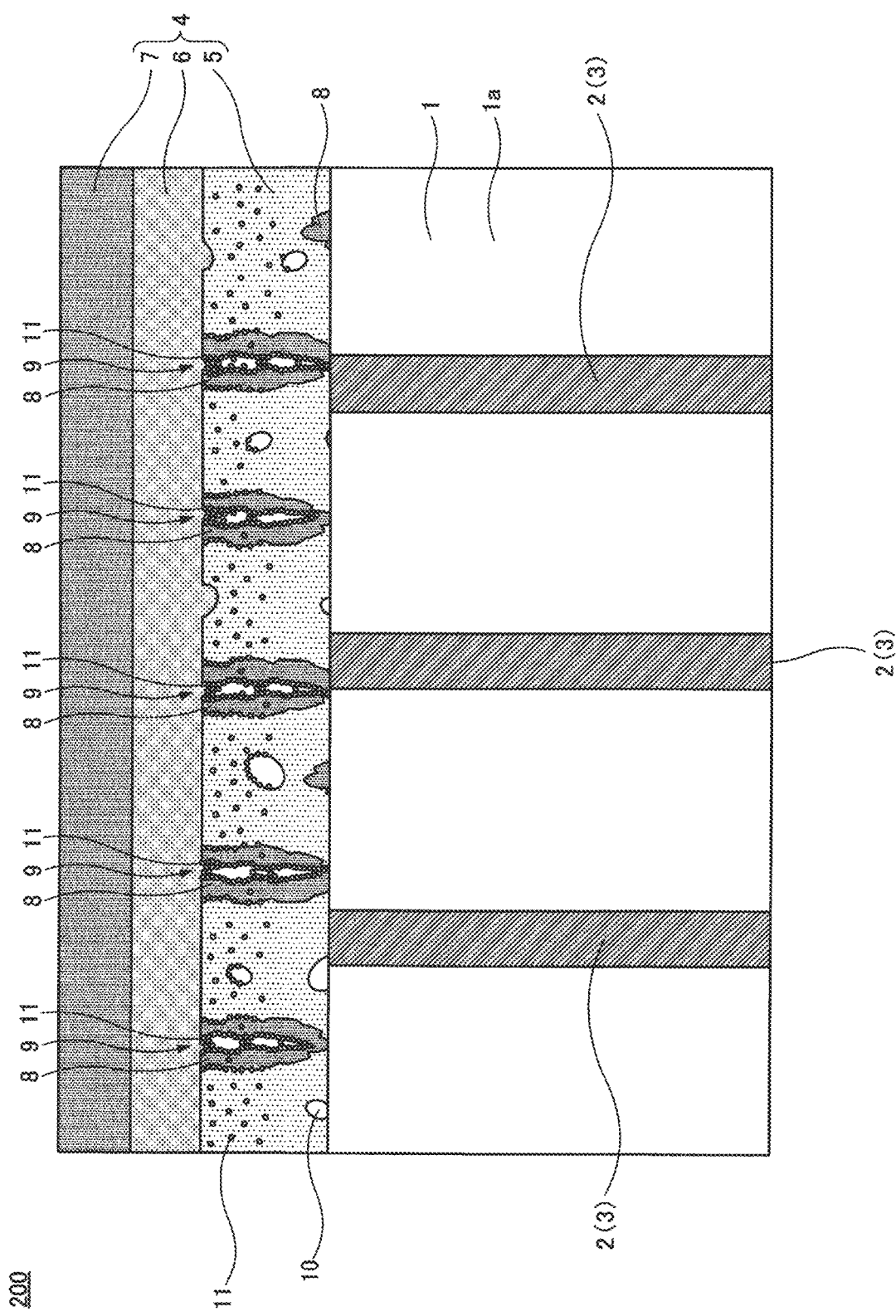

← CRACK HAS OCCURRED IN GLASS

METHOD OF MANUFACTURING MULTILAYER CERAMIC CAPACITOR AND MULTILAYER CERAMIC CAPACITOR

CROSS REFERENCE TO RELATED APPLICATIONS

This application claims the benefit of priority to Japanese Patent Application No. 2019-120607 filed on Jun. 27, 2019. The entire contents of this application are hereby incorporated herein by reference.

BACKGROUND OF THE INVENTION

1. Field of the Invention

The present invention relates to a method of manufacturing a multilayer ceramic capacitor. The present invention also relates to a multilayer ceramic capacitor that is able to be manufactured by the method of manufacturing a multilayer ceramic capacitor of the present invention.

2. Description of the Related Art

Japanese Patent Laid-Open No. 2003-243249 discloses a multilayer ceramic capacitor having a common structure.

The multilayer ceramic capacitor disclosed in Japanese Patent Laid-Open No. 2003-243249 includes a ceramic body having a stack of multiple dielectric layers and multiple internal electrodes. External electrodes are formed on the outer surface of the ceramic body. The external electrode includes a base external electrode layer formed by application and baking of a conductive paste and a plating layer formed on the base external electrode layer. The conductive paste used for forming the base external electrode layer includes metal powder and glass frit.

Higher performance of electronic devices leads to a higher demand for higher-capacity multilayer ceramic capacitors. On the other hand, a smaller size is generally demanded for electronic devices, leading to a demand for smaller-sized electronic components, such as multilayer ceramic capacitors, to be used. It is thus not preferable to increase the size of a multilayer ceramic capacitor for higher capacity of the multilayer ceramic capacitor.

Under the circumstances, a thinner external electrode is pursued as a way to increase the capacity of a multilayer ceramic capacitor without increasing its size. In other words, since the specifications of the external dimensions of multilayer ceramic capacitors are commonly defined including the thickness of the external electrode, a thinner external electrode results in an increased volume of the ceramic body correspondingly. Then, the capacity of the multilayer ceramic capacitor can be increased by, for example, increasing the number of dielectric layers of the ceramic body or increasing the area of the internal electrode.

As described above, the external electrode of a common multilayer ceramic capacitor is frequently composed of a base external electrode layer formed by application and baking of a conductive paste and a plating layer formed on the base external electrode layer. Since the base external electrode layer is commonly thicker than the plating layer, it is effective to reduce the thickness of the base external electrode for a thinner external electrode.

Although reducing the thickness of a base external electrode layer is an effective way to increase the capacity of a multilayer ceramic capacitor without increasing its size, moisture resistant reliability may decrease. That is, reducing the thickness of the base external electrode layer may allow, for example, penetration of a plating solution into pores or glass of the base external electrode layer having a reduced thickness in the formation of a plating layer on the base external electrode layer. This may result in the formation of a path that allows hydrogen included in the plating solution to reach the internal electrode, allowing penetration of hydrogen into the internal electrode, which may cause insulation degradation.

SUMMARY OF THE INVENTION

Preferred embodiments of the present invention provide water repellent which is applied to a base external electrode layer to reduce or prevent a decrease in moisture resistant reliability associated with a reduced thickness of the base external electrode layer. In the case where the base external electrode layer includes glass, however, even when the water repellent is applied, cracks may be caused in the glass included in the base external electrode layer through, for example, subsequent rinsing to increase hydrophilic properties which is performed before the formation of a plating layer. This allows penetration of a plating solution into cracks caused in glass, thus allowing penetration of hydrogen generated through plating into the internal electrode, which may cause insulation degradation.

In preferred embodiments of the present invention, cracks are formed in advance in glass included in a base external electrode layer before application of a water repellent to the base external electrode layer. That is, cracks formed in advance cause the water repellent to adhere also to the internal surfaces of the cracks through application of the water repellent, thus reducing or preventing a decrease in moisture resistant reliability which occurs through the cracks in the glass. Also, formation of new cracks in the glass will be reduced or prevented after the application of the water repellent due to the cracks formed in advance in the glass, and accordingly, insulation degradation through newly formed cracks would not matter.

Specifically, a method of manufacturing a multilayer ceramic capacitor according to a preferred embodiment of the present invention includes producing a ceramic body including a stack of a dielectric layer and an internal electrode, applying a conductive paste including metal powder and glass frit to an outer surface of the ceramic body and baking the conductive paste to form a base external electrode layer, forming a crack in glass exposed to an outer surface of the base external electrode layer, after the formation of the crack, applying a water repellent to the base external electrode layer, and forming at least one plating layer on the base external electrode layer.

A multilayer ceramic capacitor according to a preferred embodiment of the present invention includes a ceramic body including a stack of a dielectric layer and an internal electrode, and an external electrode provided on an outer surface of the ceramic body, the external electrode including a base external electrode layer that is provided on the outer surface of the ceramic body and includes glass, and at least one plating layer provided on the base external electrode layer. A water repellent is applied to the base external electrode layer. The multilayer ceramic capacitor includes a region in which the water repellent is included at a depth of not less than about 30 nm from an outer surface of the base external electrode layer.

A multilayer ceramic capacitor according to a preferred embodiment of the present invention includes a ceramic body including a stack of a dielectric layer and an internal electrode, and an external electrode provided on an outer surface of the ceramic body, the external electrode including a base external electrode layer that is provided on the outer surface of the ceramic body and includes glass, and at least one plating layer provided on the base external electrode layer. A water repellent is applied to the base external electrode layer. The multilayer ceramic capacitor includes, in a region at a depth of not less than about 30 nm from an outer surface of the base external electrode layer, a region including not less than about 10% by area of a component of the water repellent relative to a sum of a component of the base external electrode layer and a component of the water repellent.

According to methods of manufacturing multilayer ceramic capacitors of preferred embodiments of the present invention, manufactured multilayer ceramic capacitors each having high moisture resistant reliability are provided. Also, according to methods of manufacturing multilayer ceramic capacitors of preferred embodiments of the present invention, the thicknesses of the base external electrode layer and the external electrode are able to be reduced to manufacture high-capacity multilayer ceramic capacitors.

Multilayer ceramic capacitors of the preferred embodiments of the present invention each have high moisture resistant reliability. Also, multilayer ceramic capacitors of the preferred embodiments of the present invention are each able to have reduced thicknesses of the base external electrode layer and the external electrode for high capacity.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 3 is a flowchart of a method of manufacturing multilayer ceramic capacitor 100.

FIG. 7 is a sectional view of main portions of a multilayer ceramic capacitor 200 according to Preferred Embodiment 2 of the present invention.

DETAILED DESCRIPTION OF THE PREFERRED EMBODIMENTS

Figure 1:
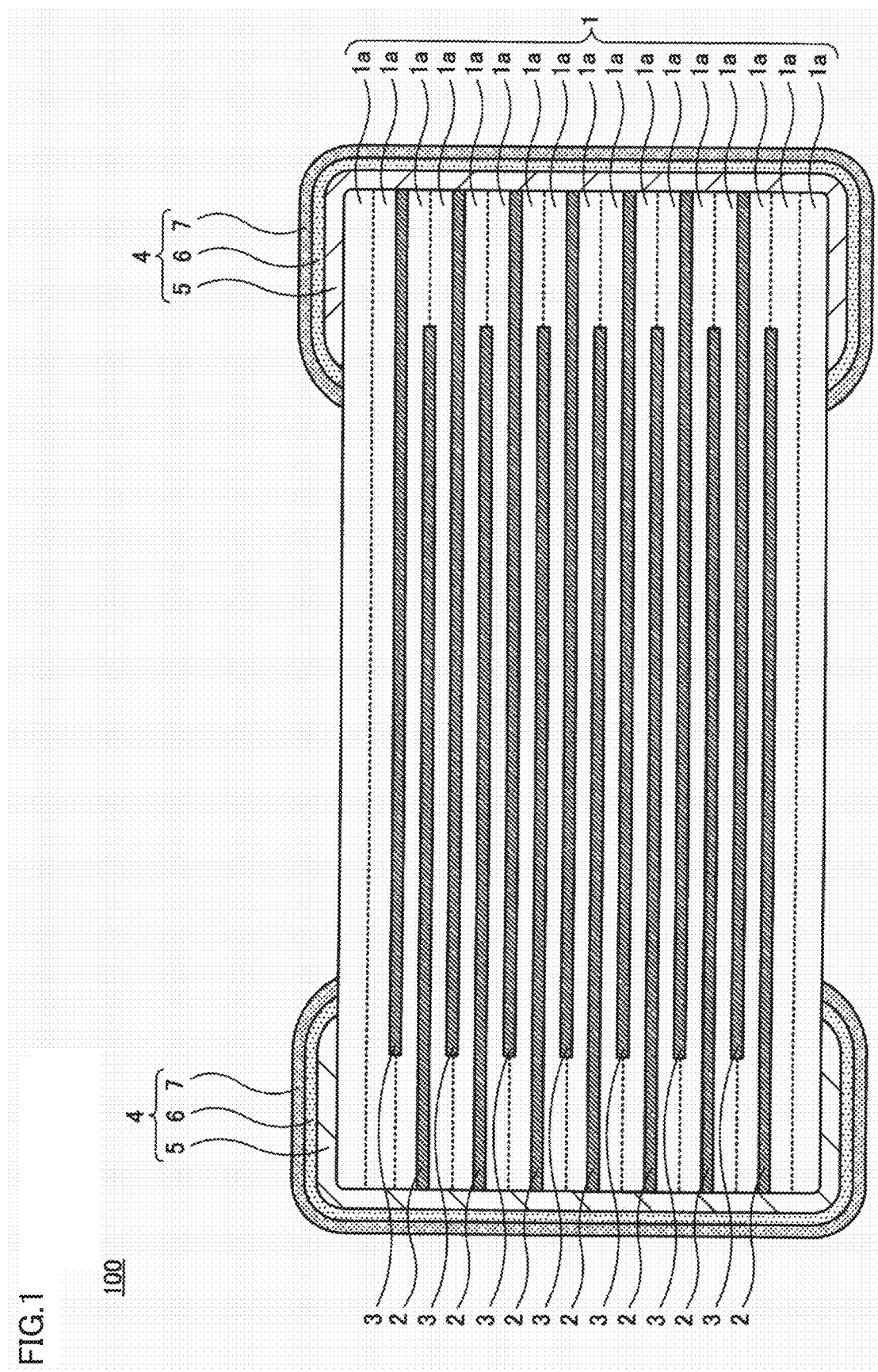
FIG. 1 is a sectional view of a multilayer ceramic capacitor 100 according to Preferred Embodiment 1 of the present invention.

Preferred embodiments of the present invention will now be described with reference to the drawings.

The preferred embodiments are merely illustrative of implementation of the present invention, and the scope of the present invention will not be limited to the descriptions of the preferred embodiments. Description on different preferred embodiments may be implemented in combination, and such implementations are also encompassed within the scope of the present invention. The drawings are provided to help understand the specification, and may be schematic, where the dimensional ratio of components and of component-to-component intervals may not agree with the dimensional ratio thereof described in the specification. Some components described in the specification may be omitted, or reduced in number, in the drawings.

Preferred Embodiment 1

Figure 2:
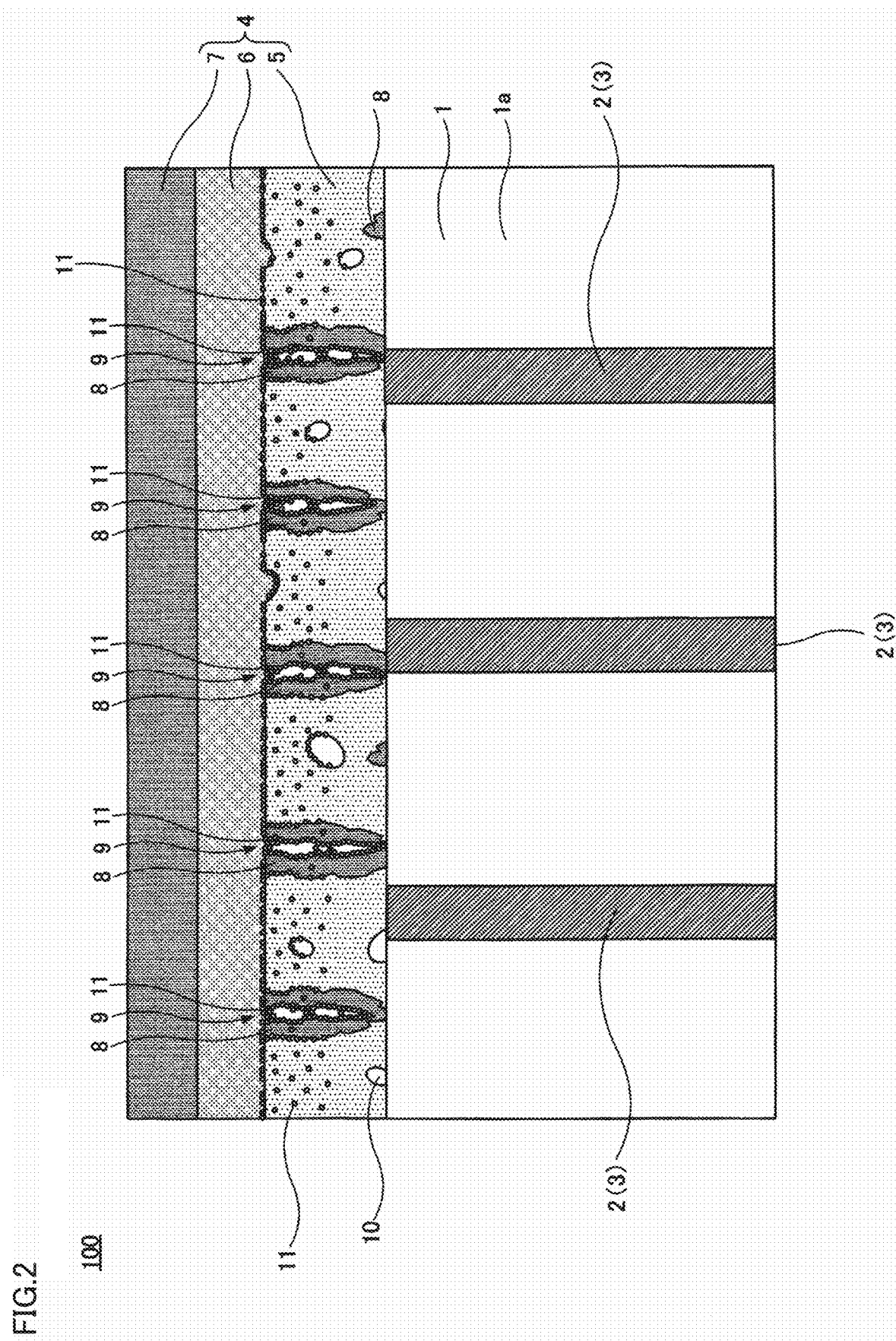
FIG. 2 is a sectional view of main portions of multilayer ceramic capacitor 100.

FIGS. 1 and 2 show a multilayer ceramic capacitor 100 manufactured by a method of manufacturing a multilayer ceramic capacitor according to Preferred Embodiment 1 of the present invention. FIG. 1 is a sectional view of multilayer ceramic capacitor 100. FIG. 2 is a sectional view of main portions of multilayer ceramic capacitor 100, which shows an external electrode 4 of multilayer ceramic capacitor 100.

Multilayer ceramic capacitor 100 includes a ceramic body 1 including a stack of a plurality of dielectric layers 1a and a plurality of internal electrodes 2 and 3. Ceramic body 1 has a rectangular parallelepiped or substantially rectangular parallelepiped shape.

Ceramic body 1 (dielectric layer 1a) may be made of any material and may be made of, for example, a dielectric ceramic mainly including $BaTiO_3$. A dielectric ceramic mainly including any other material, for example, $CaTiO_3$, $SrTiO_3$, or $CaZrO_3$, in place of $BaTiO_3$ may be used. Dielectric layer 1a may have any thickness, which is preferably, for example, about 0.3 μm to about 3.0 μm.

A metal that is a main component of internal electrodes 2 and 3 may be of any type, which may be, for example, Ni. Alternatively, any other metal, for example, Cu, Ag, Pd, or Au, may be used in place of Ni. Ni, Cu, Ag, Pd, Au, or the like may be an alloy with any other metal. Internal electrodes 2 and 3 have any thickness, which is preferably, for example, about 0.1 µm to about 2.0 µm. Internal electrode 2, 3 preferably includes, for example, a ceramic of the same or similar composition as that of ceramic body 1 (dielectric layer 1*a*).

Internal electrodes 2 are extended to one end surface. Internal electrodes 3 are extended to the other end surface.

External electrode 4 is provided on each of the opposite end surfaces of ceramic body 1. External electrode 4 may extend from the end surface to a pair of main surfaces and a pair of lateral surfaces.

Internal electrodes 2 are electrically connected to one external electrode 4. Internal electrodes 3 are electrically connected to the other external electrode 4.

External electrode 4 includes a base external electrode layer 5 and a plating layer that preferably includes, for example, a Ni plating layer 6 and a Sn plating layer 7.

Base external electrode layer 5 is provided on ceramic body 1. Base external electrode layer 5 mainly includes a metal of any type, which may be, for example, Cu. Alternatively, any other metal, for example, Ni, Ag, Pd, or Au, may be used in place of Cu. Cu, Ni, Ag, Pd, Au, or the like may be an alloy with any other metal.

Base external electrode layer 5 may have any thickness, which is preferably, for example, about 0.1 µm to about 15 µm in a thinner portion (an external electrode corresponding to an internal electrode at an end in the thickness direction). In multilayer ceramic capacitor 100 of Preferred Embodiment 1, even a thinner portion of base external electrode layer 5, which is as small as about 15 µm or less, is able to restrain penetration of hydrogen generated through plating into the internal electrode to cause insulation degradation.

Base external electrode layer 5 includes glass 8 as shown in FIG. 2. Glass 8 is added to significantly improve joint strength between ceramic body 1 and external electrode 4. Base external electrode layer 5 may include any content of glass 8, which is preferably, for example, about 30% by volume or more to provide high joint strength. The content of glass 8 in base external electrode layer 5 may be measured with a SEM.

At least a portion of glass 8 is exposed to the outer surface of base external electrode layer 5. A crack 9 is formed in glass 8 exposed from base external electrode layer 5.

A pore (void) 10 may be formed in base external electrode layer 5.

A water repellent 11 is applied to base external electrode layer 5. Examples of water repellent 11 include a water-repellent functional group and F. Preferably, F is included in a water repellent, for example. The water repellent including F is able to be highly water repellent, leading to significantly increased reliability.

In Preferred Embodiment 1, a high amount of water repellent 11 is applied to an interface between base external electrode layer 5 and Ni plating layer 6. Also, a high amount of water repellent 11 is applied to the internal surface of crack 9 formed in glass 8. Water repellent 11 is applied to an interior of base external electrode layer 5 as well. A content of water repellent 11 is relatively high in an area adjacent to or in a vicinity of an interface between base external electrode layer 5 and Ni plating layer 6 and is relatively low outside of the area adjacent to or in a vicinity of the interface. Since water repellent 11 is applied to base external electrode layer 5, even a thickness of about 15 µm or less is able to provide a sufficient moisture resistance.

A plating layer is formed on base external electrode layer 5. In Preferred Embodiment 1, the plating layer preferably has, for example, a two-layer structure of Ni plating layer 6 that is formed on base external electrode layer 5 and mainly includes Ni and Sn plating layer 7 that is formed on Ni plating layer 6 and mainly includes Sn, as described above. Ni plating layer 6 significantly increases a resistance to soldering heat and also significantly improves joint properties. Sn plating layer 7 significantly improves solderability. Any number of plating layers may be provided, and any type of a metal may be mainly included in each plating layer, which may be changed. Each plating layer may have any thickness, which is preferably, for example, about 0.1 µm to about 4.0 µm.

FIG. 3 is a flowchart of a method of manufacturing a multilayer ceramic capacitor according to Preferred Embodiment 1. The method of manufacturing a multilayer ceramic capacitor according to Preferred Embodiment 1 will be described below with reference to FIGS. 4A to 6F showing respective steps.

First, ceramic body 1 including internal electrodes 2 and 3 formed therein is produced.

Although not shown, first, a powdered dielectric ceramic, a binder resin, a solvent, and/or the like are prepared, followed by wet blending, thus producing ceramic slurry.

Subsequently, the ceramic slurry is applied in a sheet shape onto a carrier film with a die coater, a gravure coater, a microgravure coater, or the like, for example, followed by drying, thus producing ceramic green sheets. In the production of ceramic green sheets, a doctor blade or the like, for example, may be used in place of the coater.

Subsequently, a conductive paste prepared in advance is applied (e.g., printed) in a desired pattern onto the main surfaces of predetermined ceramic green sheets to form internal electrodes 2 and 3. No conductive paste is applied to the ceramic green sheets that are to become outer layers. The conductive paste may be a mixture of, for example, solvent, binder resin, metal powder (e.g., Ni powder), and/or the like.

Subsequently, the ceramic green sheets are stacked in a predetermined order and are integrated through thermo-compression bonding, thus producing an unfired ceramic body. In the case where the resultant unfired ceramic body is a mother unfired ceramic body including a plurality of unfired ceramic bodies, preferably, for example, the mother unfired ceramic body is divided into individual unfired ceramic bodies at this stage.

Subsequently, the unfired ceramic body is fired in a predetermined profile to complete ceramic body 1. Prior to firing, a debinding process is preferably performed, for example, to cause the binder resin included in the unfired ceramic body to disappear or decrease. Through firing of the unfired ceramic body, the ceramic green sheets are fired to become dielectric layers 1*a*, and the conductive pastes applied to the main surfaces of the ceramic green sheets are simultaneously fired to become internal electrodes 2 and 3.

Figure 4A:
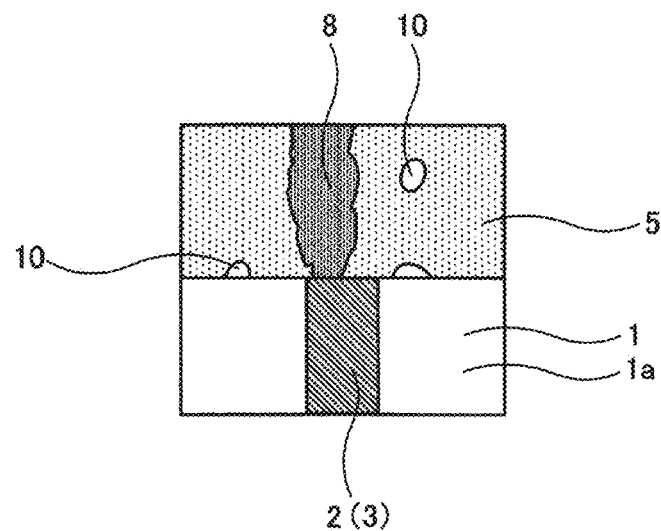
FIG. 4A is a sectional view of main portions, which shows a step performed in the method of manufacturing multilayer ceramic capacitor 100.

Subsequently, base external electrode layer 5 is formed on the end surface of ceramic body 1, as shown in FIG. 4A. Specifically, a conductive paste is first applied. The conductive paste to be applied has a mixture of solvent, binder resin, metal powder (e.g., Cu powder), glass frit, and/or the like. The conductive paste is then heated to a predetermined temperature and is baked on the outer surface of ceramic body 1, thus forming base external electrode layer 5.

Glass 8 is formed in base external electrode layer 5. A portion of glass 8 is exposed to the outer surface of base external electrode layer 5. Pore 10 may be formed in base external electrode layer 5.

Figure 4B:
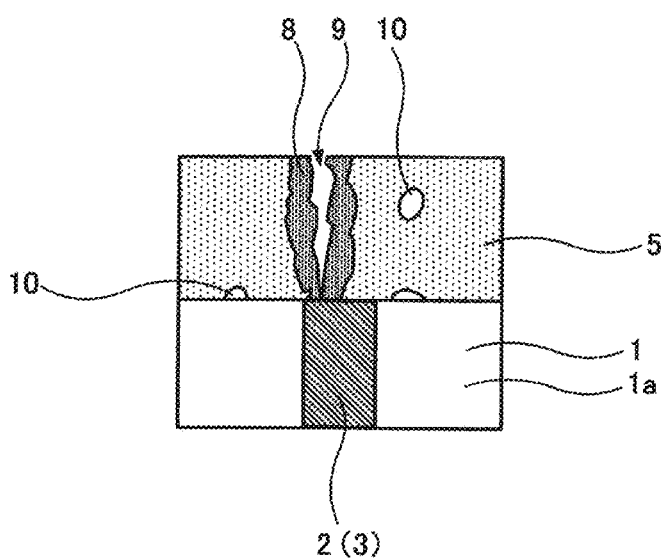
FIG. 4B is a sectional view of main portions, which shows a step performed in the method of manufacturing multilayer ceramic capacitor 100.

Subsequently, crack 9 is formed in glass 8 exposed from the outer surface of base external electrode layer 5, as shown in FIG. 4B. Crack 9 is formed in glass 8 at this stage because water repellent 11 is satisfactorily applied to the internal surface of the crack in the step of applying water repellent 11 to base external electrode layer 5.

In Preferred Embodiment 1, wet barrel finishing is performed on ceramic body 1 with base external electrode layer 5 in order to form crack 9 in glass 8 exposed from the outer surface of base external electrode layer 5. When wet barrel finishing is performed, water reacts with glass 8 to form a crack in glass 8. The way of forming crack 9 in glass 8 exposed from the outer surface of base external electrode layer 5 is not limited to wet barrel finishing, and for example, rinsing or a plasma treatment may be used. Accordingly, crack 9 is able to be formed in glass 8 exposed from the outer surface of base external electrode layer 5.

Wet barrel finishing performed on ceramic body 1 with base external electrode layer 5 is able to provide the following secondary advantageous effects: for example, pore 10 exposed to the outer surface of base external electrode layer 5 is filled to be smaller or disappear.

Figure 5C:
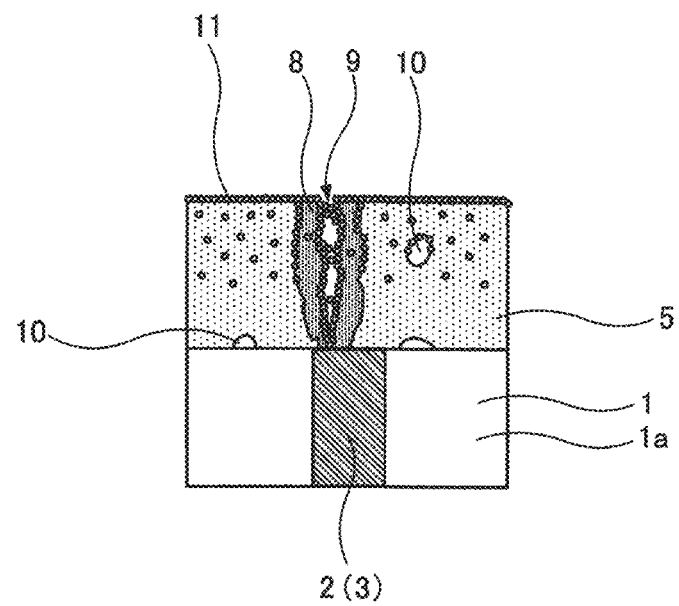
FIG. 5C is a sectional view of main portions, which shows a step performed in the method of manufacturing multilayer ceramic capacitor 100.

Subsequently, ceramic body 1 with base external electrode layer 5 is immersed in the water repellent to apply water repellent 11 to base external electrode layer 5 as shown in FIG. 5C. Water repellent 11 penetrates base external electrode layer 5. Also, water repellent 11 adheres to the internal surface of crack 9 in glass 8. Water repellent 11 adheres to the outer surfaces of ceramic body 1 and base external electrode layer 5 as well. In the present invention, water repellent 11 including F is used.

Figure 5D:
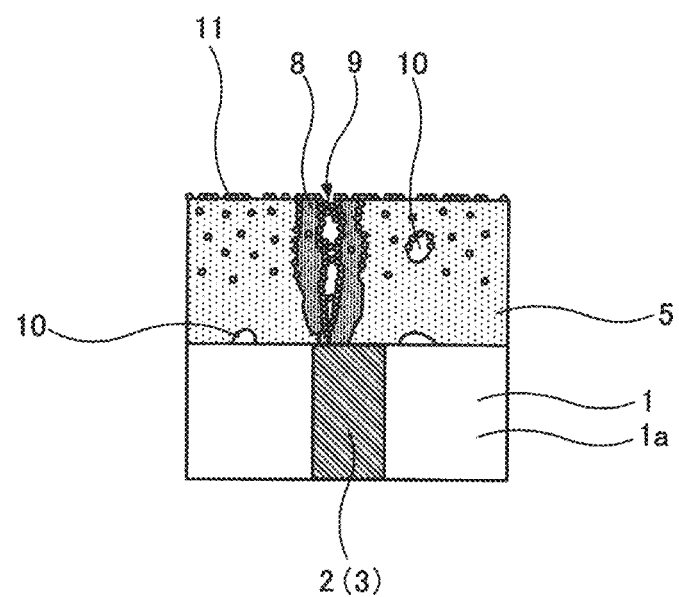
FIG. 5D is a sectional view of main portions, which shows a step performed in the method of manufacturing multilayer ceramic capacitor 100.

Subsequently, a hydrophilization treatment is performed on ceramic body 1 with base external electrode layer 5 and on base external electrode layer 5, as shown in FIG. 5D. The hydrophilization treatment is, for example, rinsing or an immersion treatment with an alcoholic solution. The hydrophilization treatment is performed because Ni plating layer 6 is able to be formed in the following step.

Figure 6E:
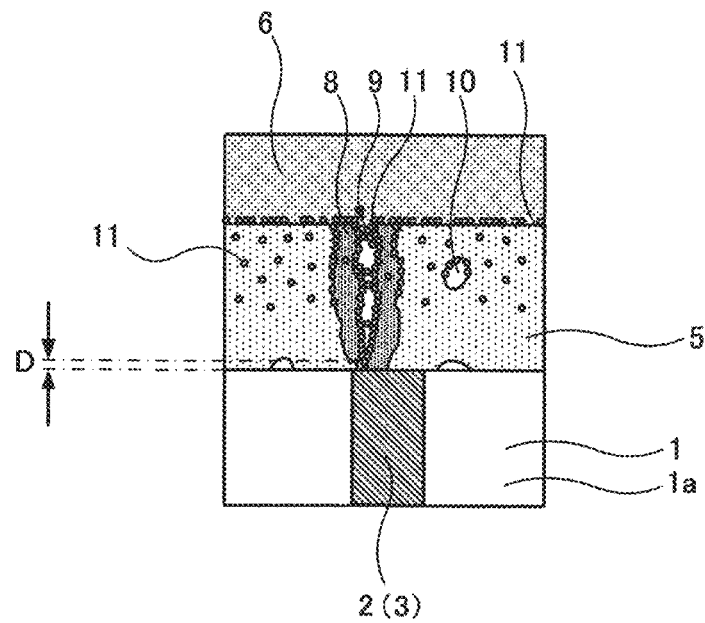
FIG. 6E is a sectional view of main portions, which shows a step performed in the method of manufacturing multilayer ceramic capacitor 100.

Subsequently, Ni plating layer 6 is formed on the outer surface of base external electrode layer 5 by electrolytic plating, as shown in FIG. 6E. In this formation, water repellent 11 is adhering to an interior of crack 9, thus restraining plating inside of crack 9. A sufficient distance is thus able to be secured between internal electrode 2, 3 and Ni plating layer 6, restraining hydrogen generated by plating from penetrating the internal electrode to cause insulation degradation.

Figure 6F:
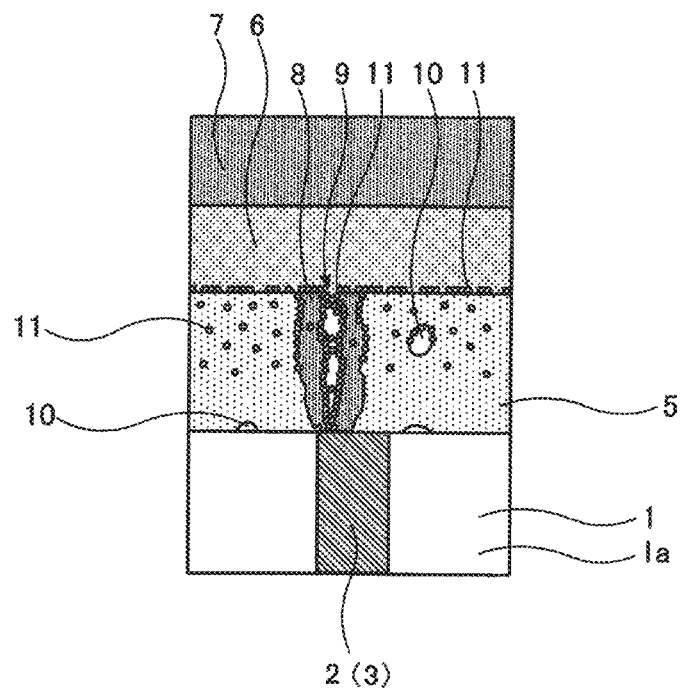
FIG. 6F is a sectional view of main portions, which shows a step performed in the method of manufacturing multilayer ceramic capacitor 100.

Lastly, Sn plating layer 7 is formed on Ni plating layer to complete multilayer ceramic capacitor 100 according to Preferred Embodiment 1, as shown in FIG. 6F.

In multilayer ceramic capacitor 100 according to Preferred Embodiment 1, since water repellent 11 is applied (is adhering) to the internal surface of crack 9 in glass 8, hydrogen generated by plating is restrained from penetrating internal electrodes 2 and 3, as descried above. Multilayer ceramic capacitor 100 thus reduces or prevents insulation degradation due to penetration of hydrogen into internal electrodes 2 and 3, and accordingly has high moisture resistant reliability.

Preferred Embodiment 2

FIG. 7 shows a multilayer ceramic capacitor 200 manufactured by a method of manufacturing a multilayer ceramic capacitor according to Preferred Embodiment 2 of the present invention. FIG. 7 is a sectional view of main portions of multilayer ceramic capacitor 200, which shows external electrode 4 of multilayer ceramic capacitor 200.

Figure 8:
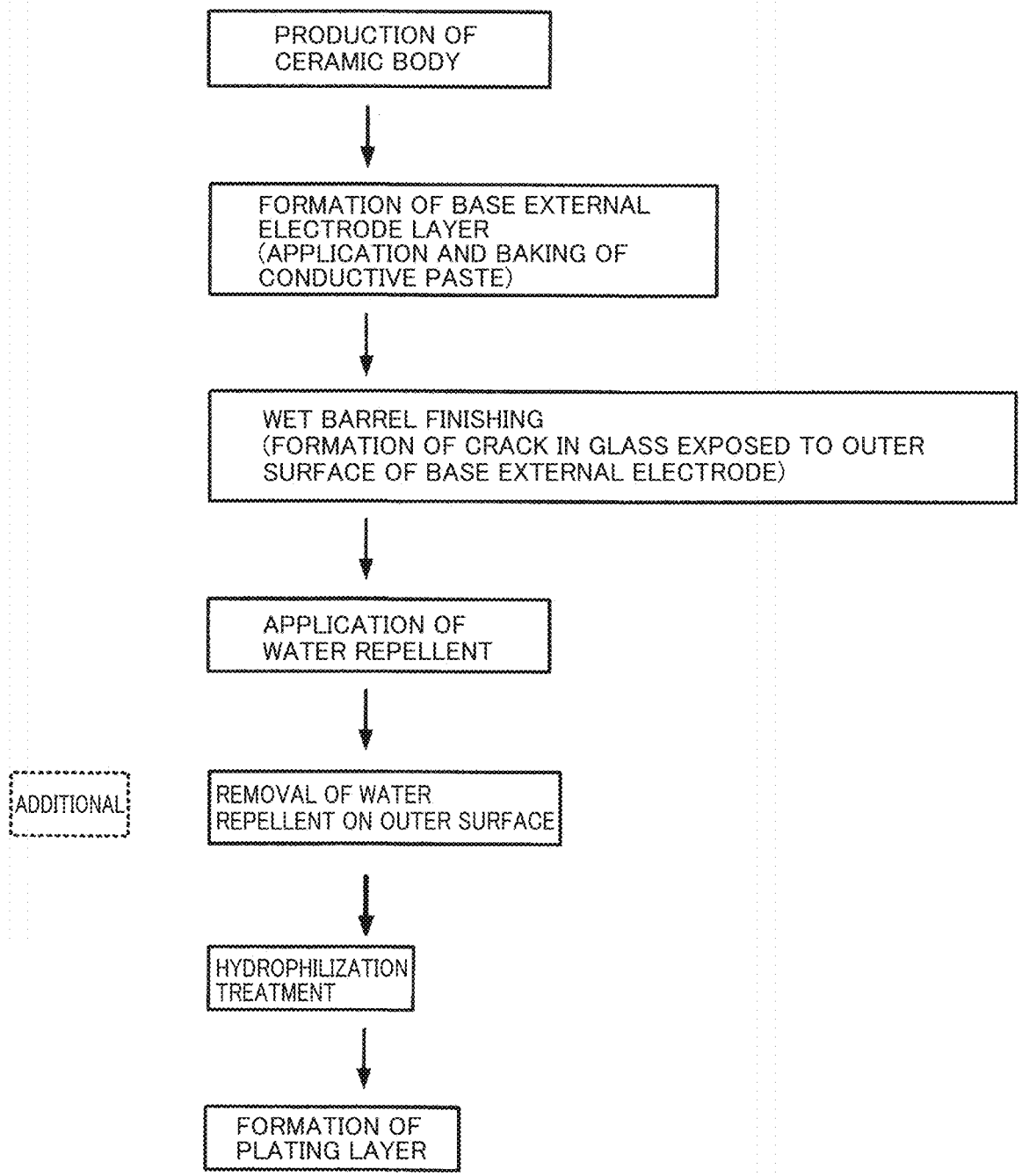
FIG. 8 is a flowchart of a method of manufacturing multilayer ceramic capacitor 200.

FIG. 8 shows a flowchart of the method of manufacturing a multilayer ceramic capacitor according to Preferred Embodiment 2.

The method of manufacturing a multilayer ceramic capacitor according to Preferred Embodiment 2 is provided by adding the step of removing a water repellent to the method of manufacturing a multilayer ceramic capacitor according to Preferred Embodiment 1 described above. Specifically, the step of removing unnecessary water repellent 11 adhering to the outer surfaces of ceramic body 1 and base external electrode layer 5 is added between the step of applying water repellent 11 to base external electrode layer 5 (see FIG. 5C) and the step of performing a hydrophilization treatment on ceramic body 1 with base external electrode layer 5 (see FIG. 5D) in the method of manufacturing a multilayer ceramic capacitor according to Preferred Embodiment 1. The step of removing a water repellent is not particularly limited as long as water repellent 11 on the surface of the base external electrode is able to be removed, which may be, for example, cleaning with a solution, or a plasma treatment.

As the step of removing unnecessary water repellent 11 adhering to the outer surfaces of ceramic body 1 and base external electrode layer 5 is added, multilayer ceramic capacitor 200 has no water repellent 11 at the interface between base external electrode layer 5 and Ni plating layer 6, as shown in FIG. 7. Since no water repellent 11 is present at the interface between base external electrode layer 5 and Ni plating layer 6, multilayer ceramic capacitor 200 has plating adhesion of base external electrode layer 5 which is higher than that of multilayer ceramic capacitor 100.

Also in multilayer ceramic capacitor 200, crack 9 is formed in glass 8 exposed to the outer surface of base external electrode layer 5, and water repellent 11 is adhering to the internal surface of crack 9, as in multilayer ceramic capacitor 100. Multilayer ceramic capacitor 200 thus also has high moisture resistant reliability, similarly to multilayer ceramic capacitor 100.

The following experiment was conducted to check effectiveness of preferred embodiments of the present invention.

Seventy samples were manufactured for each of Example 1, Example 2, Comparative Example 1, and Comparative Example 2.

First, multilayer ceramic capacitor 100 produced in Preferred Embodiment 1 described above was provided as the sample of Example 1. In the sample of Example 1, thus, crack 9 was formed in base external electrode layer 5, and water repellent 11 adhered to the internal surface of crack 9. In the sample of Example 1, water repellent 11 was present at the interface between base external electrode layer 5 and Ni plating layer 6 (see FIG. 2).

Multilayer ceramic capacitor 200 produced in Preferred Embodiment 2 was provided as the sample of Example 2. Also in the sample of Example 2, thus, crack 9 was formed in base external electrode layer 5, and water repellent 11 adhered to the internal surface of crack 9. In the sample of Example 2, however, no water repellent 11 was present at the interface between base external electrode layer 5 and Ni plating layer 6 (see FIG. 7).

Figure 9:
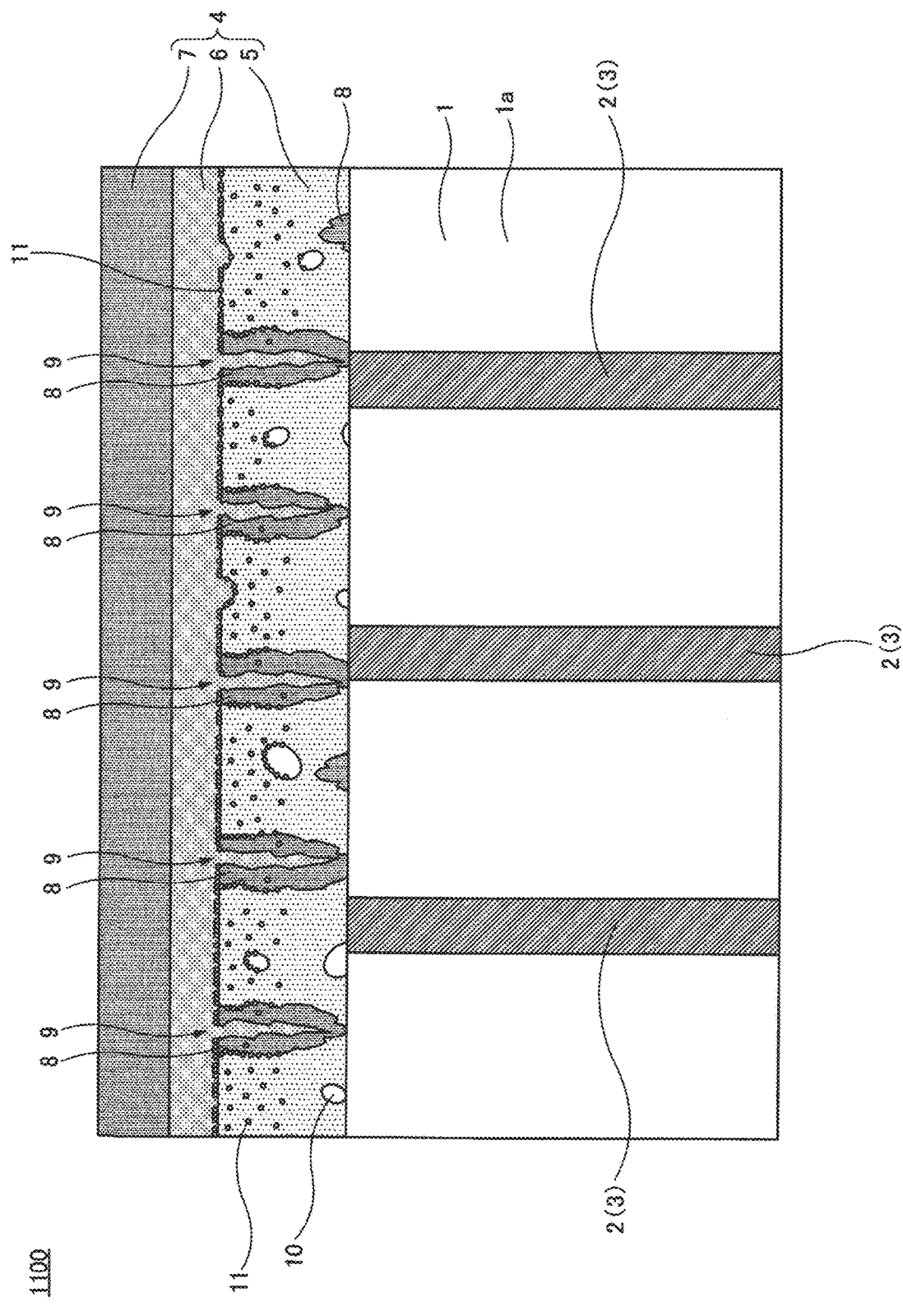
FIG. 9 is a sectional view of main portions of a multilayer ceramic capacitor 1100 according to Comparative Example 1.
Figure 10:
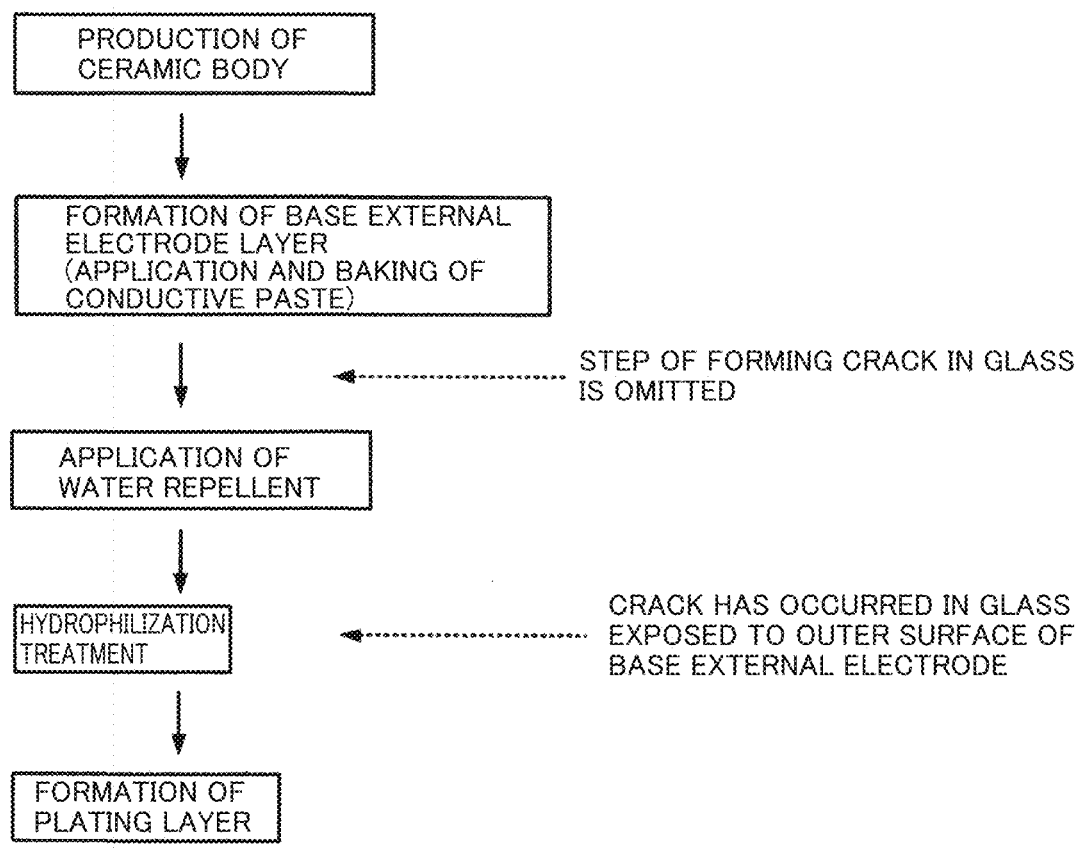
FIG. 10 is a flowchart of a method of manufacturing multilayer ceramic capacitor 1100.

A multilayer ceramic capacitor 1100 shown in FIG. 9 was manufactured and provided as the sample according to Comparative Example 1. FIG. 10 shows a flowchart of the method of manufacturing multilayer ceramic capacitor 1100.

The method of manufacturing multilayer ceramic capacitor 1100 according to Comparative Example 1 omits one of the steps of the method of manufacturing a multilayer ceramic capacitor according to Preferred Embodiment 1. Specifically, though Preferred Embodiment 1 includes the step of forming crack 9 in glass 8 exposed from the outer surface of base external electrode layer 5 (see FIG. 4B) between the step of forming base external electrode layer 5 on the outer surface of ceramic body 1 and the step of applying water repellent 11 to base external electrode layer 5, the method of manufacturing multilayer ceramic capacitor 1100 according to Comparative Example 1 omits the step of forming crack 9 in glass 8. The method of manufacturing multilayer ceramic capacitor 1100 according to Comparative Example 1 will be briefly described with reference to FIGS. 11A to 13E.

Figure 11A:
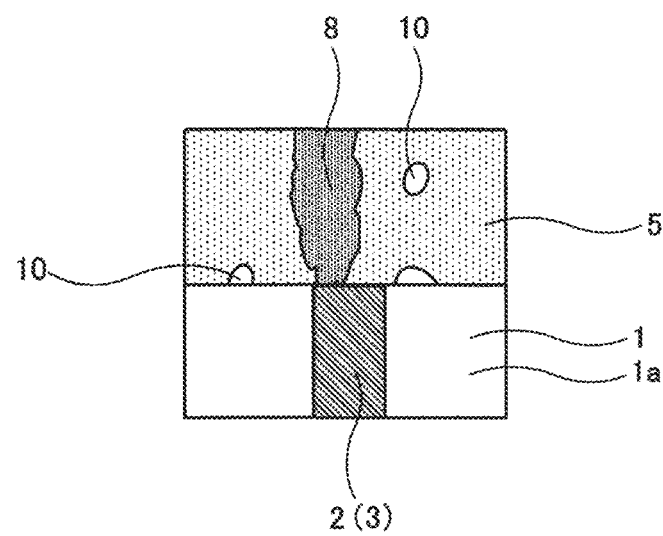
FIG. 11A is a sectional view of main portions, which shows a step performed in the method of manufacturing multilayer ceramic capacitor 1100.

First, base external electrode layer 5 is formed on the outer surface of ceramic body 1, as shown in FIG. 11A. Glass 8 is formed in base external electrode layer 5, and a portion of glass 8 is exposed to the outer surface of base external electrode layer 5. In the method of manufacturing multilayer ceramic capacitor 1100 according to Comparative Example 1, the step of forming crack 9 in glass 8 is not performed as described above.

Figure 11B:
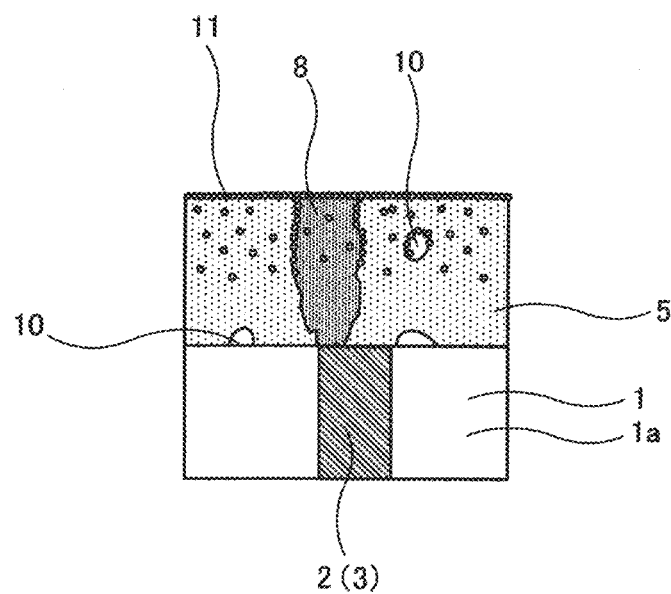
FIG. 11B is a sectional view of main portions, which shows a step performed in the method of manufacturing multilayer ceramic capacitor 1100.

Subsequently, ceramic body 1 with base external electrode layer 5 is immersed in the water repellent, thus applying water repellent 11 to base external electrode layer 5 as shown in FIG. 11B. Water repellent 11 penetrates base external electrode layer 5. Water repellent 11 also adheres to the outer surfaces of ceramic body 1 and base external electrode layer 5.

Figure 12C:
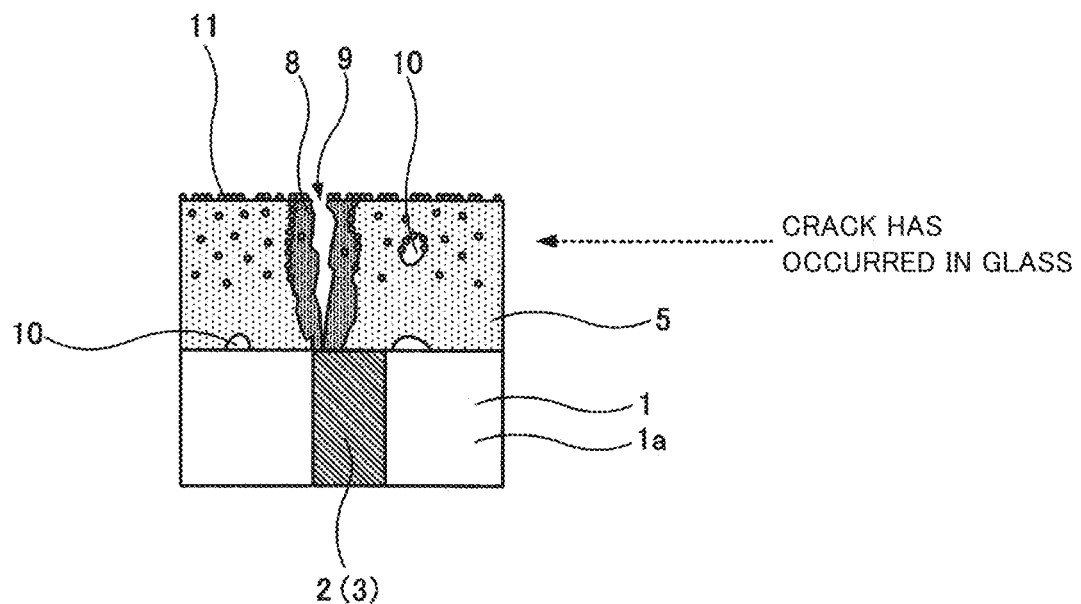
FIG. 12C is a sectional view of main portions, which shows a step performed in the method of manufacturing multilayer ceramic capacitor 1100.

Subsequently, rinsing is performed on ceramic body 1 with base external electrode layer 5 and on base external electrode layer 5, thus providing hydrophilic properties to the outer surfaces of ceramic body 1 and base external electrode layer 5, as shown in FIG. 12C.

In the method of manufacturing multilayer ceramic capacitor 1100 according to Comparative Example 1, crack 9 is formed in glass 8 exposed to the outer surface of base external electrode layer 5 through this rinsing. Crack 9 is, however, formed after the application of water repellent 11, and thus, no water repellent 11 is adhering to the internal surface. Although crack 9 is not necessarily formed to the entirety of glass 8 through this rinsing, it is conceivable that crack 9 will be formed in at least a portion of glass 8.

Figure 12D:
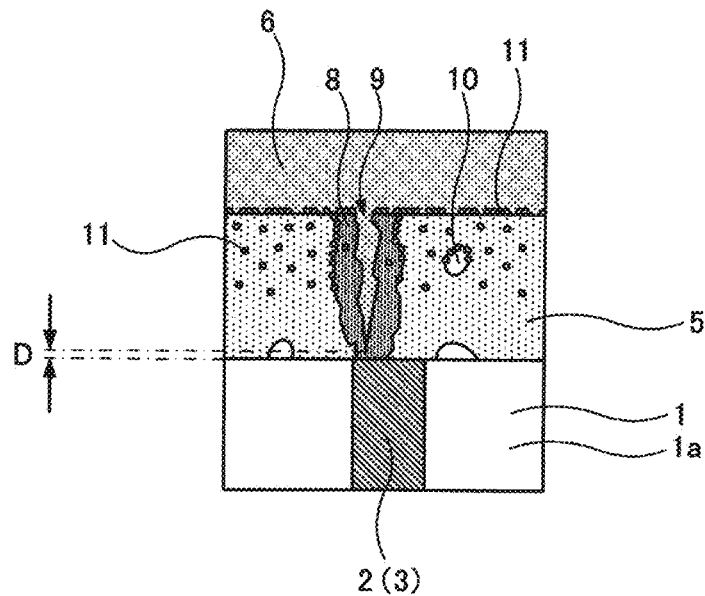
FIG. 12D is a sectional view of main portions, which shows a step performed in the method of manufacturing multilayer ceramic capacitor 1100.

Subsequently, Ni plating layer 6 is formed on the outer surface of base external electrode layer 5 through electrolytic plating, as shown in FIG. 12D. In this formation, a plating solution may penetrate crack 9 formed in glass 8. Since a distance D between the lower most portion of crack 9 formed in glass 8 and internal electrode 2, 3 is extremely small as shown in FIG. 12D, hydrogen generated from a plating that has penetrated crack 9 may reach internal electrode 2, 3 to cause insulation degradation. In other words, the method of manufacturing multilayer ceramic capacitor 1100 according to Comparative Example 1 may reduce moisture resistant reliability due to the plating solution in the formation of Ni plating layer 6.

Figure 13E:
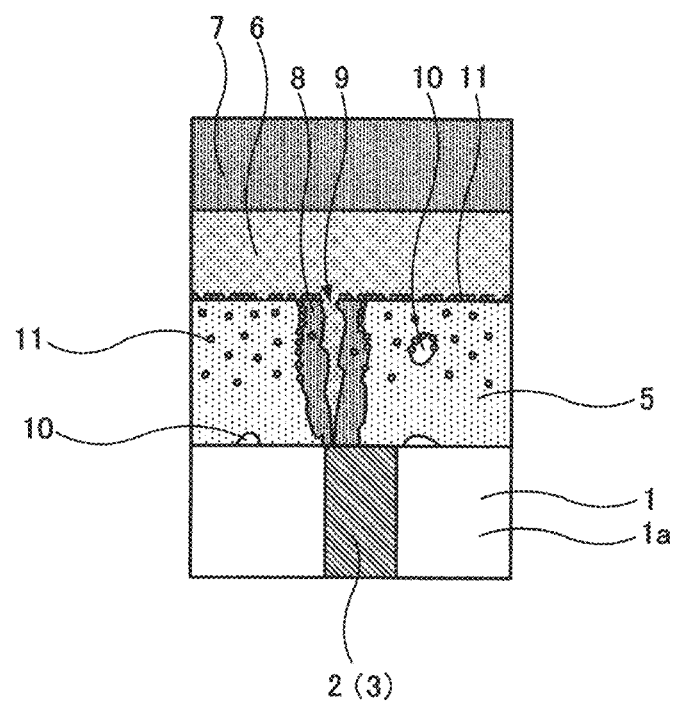
FIG. 13E is a sectional view of main portions, which shows a step performed in the method of manufacturing multilayer ceramic capacitor 1100.

Lastly, Sn plating layer 7 is formed on Ni plating layer to complete multilayer ceramic capacitor 1100 according to Comparative Example 1, as shown in FIG. 13E.

Although crack 9 is formed in base external electrode layer 5 as shown in FIG. 9 because multilayer ceramic capacitor 1100 according to Comparative Example 1 is manufactured through the above steps, water repellent 11 is not adhering to the internal surface of crack 9. However, multilayer ceramic capacitor 1100 includes water repellent 11 at the interface between base external electrode layer 5 and Ni plating layer 6.

Figure 14:
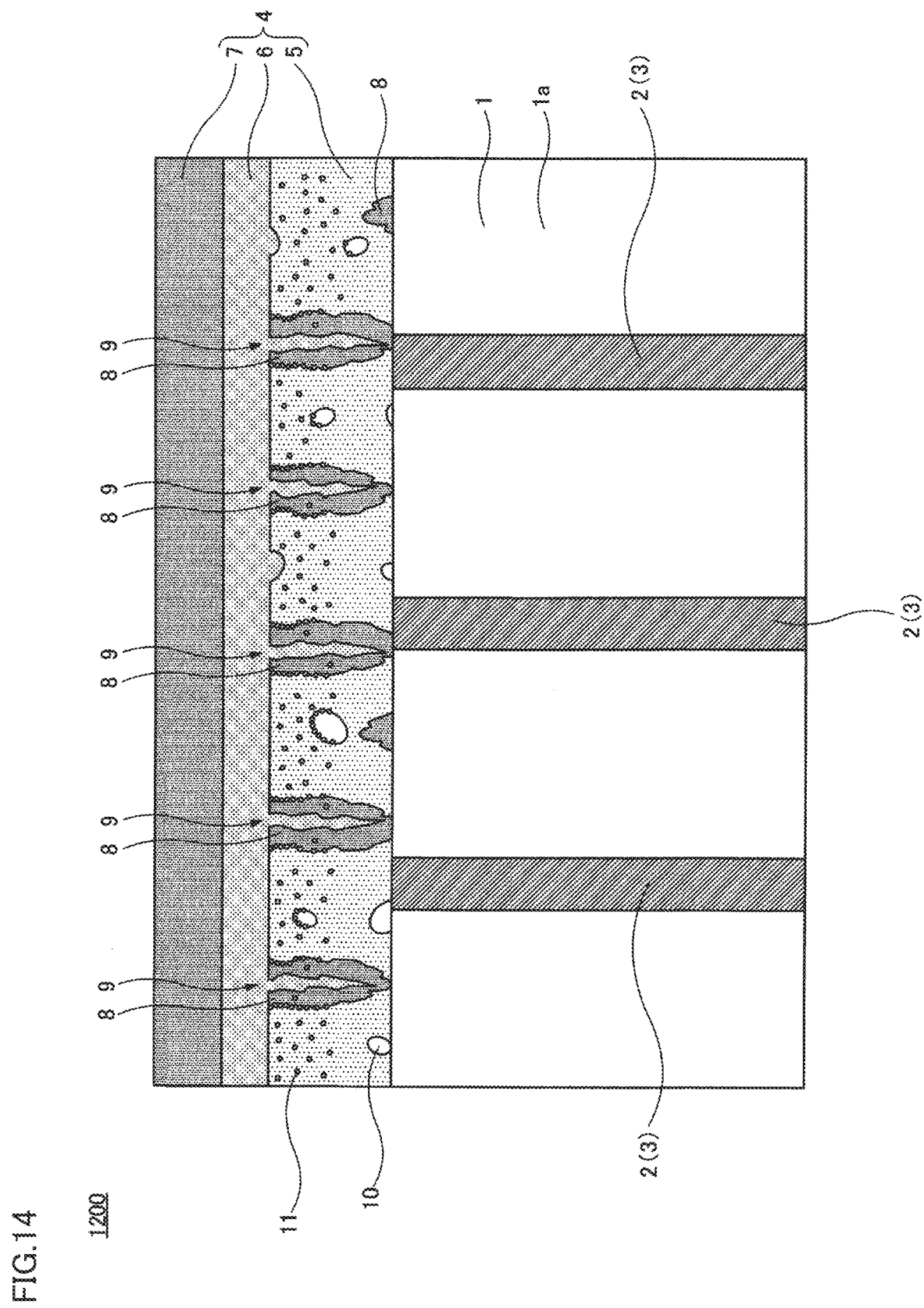
FIG. 14 is a sectional view of main portions of a multilayer ceramic capacitor 1200 according to Comparative Example 2.
Figure 15:
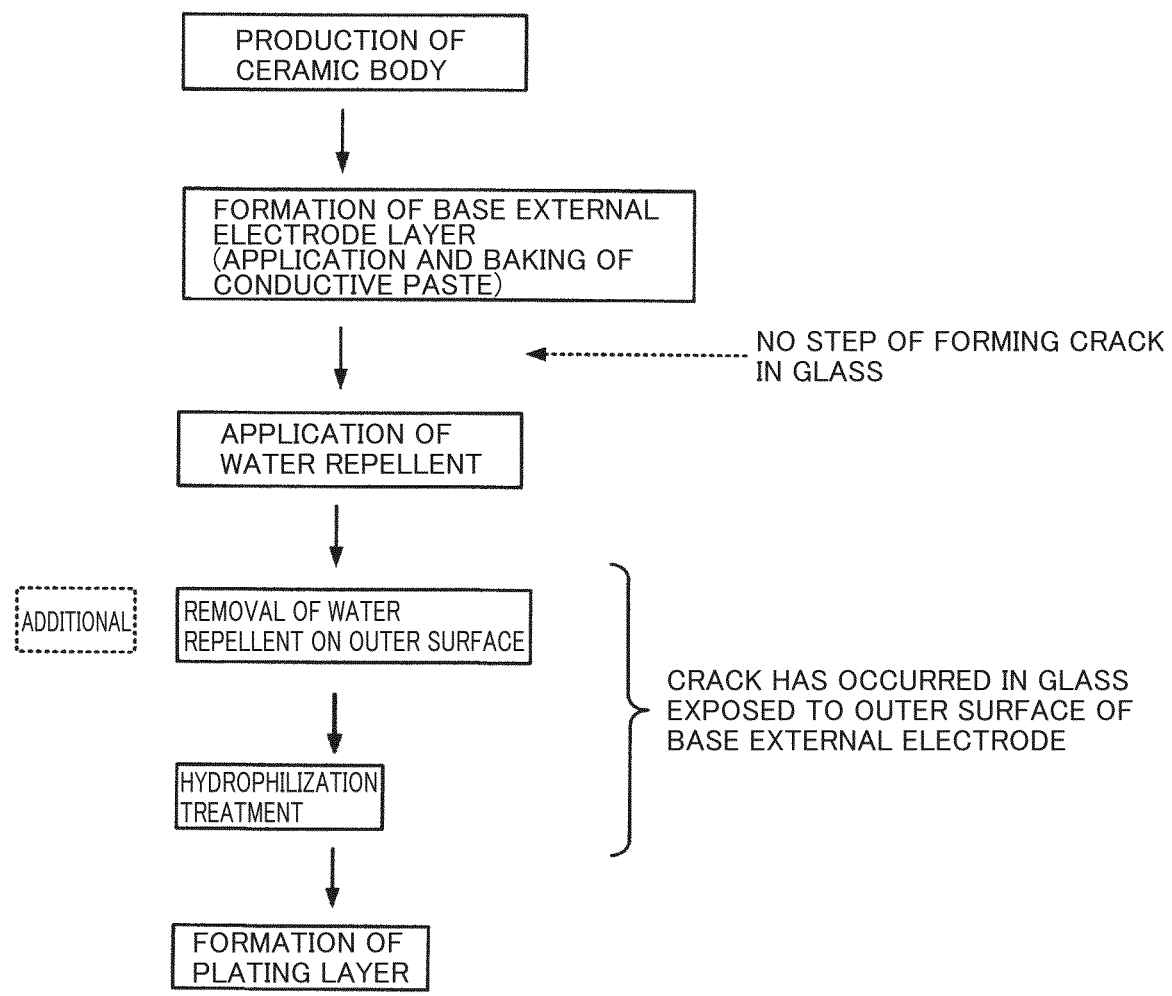
FIG. 15 is a flowchart of a method of manufacturing multilayer ceramic capacitor 1200.

A multilayer ceramic capacitor 1200 shown in FIG. 14 was manufactured and provided as the sample according to Comparative Example 2. FIG. 15 shows a flowchart of a method of manufacturing multilayer ceramic capacitor 1200.

The method of manufacturing multilayer ceramic capacitor 1200 according to Comparative Example 2 is provided by adding one step to the method of manufacturing multilayer ceramic capacitor 1100 according to Comparative Example 1. Specifically, the step of removing a water repellent is performed on the outer surfaces of ceramic body 1 and base external electrode layer 5 to remove unnecessary water repellent 11 adhering to the outer surfaces of ceramic body 1 and base external electrode layer 5 is added between the step of applying water repellent 11 to base external electrode layer 5 (see FIG. 11B) and the step of rinsing ceramic body 1 with base external electrode layer 5 (see FIG. 12C) in the method of manufacturing multilayer ceramic capacitor 1100 according to Comparative Example 1.

In the method of manufacturing multilayer ceramic capacitor 1200 according to Comparative Example 2, crack 9 is formed in glass 8 exposed to the outer surface of base external electrode layer 5 also in this plasma treatment (second plasma treatment).

As a result, multilayer ceramic capacitor 1200 according to Comparative Example 2 includes no water repellent 11 at the interface between base external electrode layer 5 and Ni plating layer 6, as shown in FIG. 14. In multilayer ceramic capacitor 1200, though crack 9 is formed in base external electrode layer 5, water repellent 11 is not adhering to the internal surface of crack 9.

X-ray photoelectron spectroscopy (XPS) analysis in depth direction was performed on base external electrode layer 5 of each of the samples according to Example 1, Example 2, Comparative Example 1, and Comparative Example 2 to examine the atomic concentration (atm %) of F in the depth direction.

First, Sn plating layer 7 and Ni plating layer 6 were removed from external electrode 4 of each sample. Although various processes may be applied to remove Sn plating layer 7 and Ni plating layer 6, polishing was performed in this experiment.

Subsequently, the surface of base external electrode layer 5 was removed at a pace of about 2 nm/min. in terms of $SiO_2$ sputtering rate for each sample. The place of removing was the central portion of base external electrode layer 5 formed on the end surface of ceramic body 1. Also, removing was performed in a square of about 10 μm×about 10 μm.

In the XPS analysis in depth direction, though the atomic concentrations of Cu, O, and C being main elements of base external electrode layer 5 were also measured, the atomic concentration of F being a main element of water repellent 11 was particularly focused here.

Table 1 shows the atomic concentration (atm %) of F in each depth in each sample.

TABLE 1

| | | Depth (nm) from surface of base external electrode layer and atomic concentration (atm %) of F | | | | | | | |
|---|---|---|---|---|---|---|---|---|---|
| | | 0 nm | 5 nm | 10 nm | 20 nm | 30 nm | 40 nm | 50 nm | 60 nm |
| Example 1 (multilayer ceramic capacitor 100) | Water repellent is adhering to internal surface of crack Water repellent is present at interface between base electrode layer and Ni plating layer | 50% | 23% | 20% | 18% | 10% | 14% | 12% | 11% |
| Example 2 (multilayer ceramic apacitor 200) | Water repellent is adhering to internal surface of crack Water repellent is not present at interface between base electrode layer and Ni plating layer | 10% | 0% | 0% | 0% | 10% | 10% | 11% | 12% |
| Comparative Example 1 (multilayer ceramic capacitor 1100) | Water repellent is not adhering to internal surface of crack Water repellent is present at interface between base electrode layer and Ni plating layer | 44% | 2% | 1% | 0% | 0% | 0% | 0% | 0% |
| Comparative Example 2 (multilayer ceramic capacitor 1200) | Water repellent is not adhering to internal surface of crack Water repellent is not present at interface between base electrode layer and Ni plating layer | 10% | 0% | 0% | 0% | 0% | 0% | 0% | 0% |

It is considered that F is present in a region at a depth of greater than about 0 nm in the sample according to Example 1 because water repellent 11 is adhering to the internal surface of crack 9.

It is considered that F is present in a region at a depth of not less than about 30 nm in the sample according to Example 2 because water repellent 11 is adhering to the internal surface of crack 9. It is also considered that F has about 0% by area in a region of about 5 nm or more and about 20 nm or less because water repellent 11 has been removed also from this region adjacent to or in a vicinity of the outer surface through a water repellent removing step of removing water repellent 11 from the outer surface of base external electrode layer 5.

The samples according to Example 1 and Example 2 have a region in which about 10% by area or more of F relative to the sum of the components (Cu, O, C) of base external electrode layer 5 and the component (F) of water repellent 11 is included also in a region at a depth of not less than about 30 nm, as shown in Table 1.

In contrast, the sample according to Comparative Example 1 has no F in a region at a depth of not less than about 20 nm. Conceivably, this is because no water repellent 11 is adhering to the internal surface of crack 9.

The sample according to Comparative Example 2 has no F in a region at a depth of not less than about 5 nm. Conceivably, this is because water repellent 11 is not adhering to the internal surface of crack 9, and water repellent 11 has been removed from a region of about 5 nm or about 10 nm through the water repellent removing step.

It was estimated through XPS analysis in depth direction that water repellent 11 was adhering to the internal surface of crack 9 in Example 1 and Example 2.

The moisture resistant reliability test was conducted on each of the samples according to Example 1, Example 2, Comparative Example 1, and Comparative Example 2. The number subjected to the test was 70 for each sample.

Specifically, each sample was left for 72 hours under the application of electric power of about 0.5 WV in the environment of a temperature of about 125° C. and a relative moisture of about 95%, and the IR value (insulation resistance value) of each sample was measured. Then, a sample whose IR value was reduced to the order of 0.9 or below from the initial value was regarded as an IR-degraded product. Table 2 shows the number of IR-degraded products of each sample.

TABLE 2

| | Number of IR-degraded products |
|---|---|
| Example 1 (multilayer ceramic capacitor 100) | 0/70 products |
| Example 2 (multilayer ceramic capacitor 200) | 0/70 products |
| Comparative Example 1 (multilayer ceramic capacitor 1100) | 10/70 products |
| Comparative Example 2 (multilayer ceramic capacitor 1200) | 8/70 products |

Table 2 confirmed that in the samples according to Example 1 and Example 2 in which water repellent 11 was presumably adhering to the internal surface of crack 9 in glass 8, the number of IR-degraded products was zero, and high moisture resistant reliability was provided. In contrast, it was observed that ten IR-degraded products occurred in the samples according to Comparative Example 1 and eight IR-degraded products occurred in the samples according to Comparative Example 2, and in both of the examples, water repellent 11 was presumably not adhering to the internal surface of crack 9 of glass 8, thus providing a deficiency in moisture resistant reliability. The effectiveness of the preferred embodiments of the present invention was checked as described above.

Description has been provided with respect to the method of manufacturing a multilayer ceramic capacitor according to each of Preferred Embodiment 1 and Preferred Embodiment 2 and a multilayer ceramic capacitor manufactured in each preferred embodiment. However, the present invention is not limited to the above description and may be variously modified in adherence with the spirit of the present invention.

The method of manufacturing a multilayer ceramic capacitor according to a preferred embodiment of the present invention is as described in "SUMMARY OF THE INVENTION".

The water repellent preferably includes F in the method of manufacturing a multilayer ceramic capacitor, for example. Accordingly, the water repellent is able to provide a high water-repellent property.

The multilayer ceramic capacitor according to a preferred embodiment of the present invention and the multilayer ceramic capacitor according to another preferred embodiment of the present invention are each as described in "SUMMARY OF THE INVENTION".

The water repellent preferably includes F in these multilayer ceramic capacitors, for example. Accordingly, the water repellent is able to provide a high water-repellent property.

In these multilayer ceramic capacitors, glass is preferably exposed to the outer surface of the base external electrode layer, and the crack is preferably formed in the glass exposed to the outer surface of the base external electrode layer, for example. Further, the water repellent preferably adheres to the internal surface of the crack, for example. Accordingly, the moisture resistant reliability of the multilayer ceramic capacitor significantly improves.

Preferably, for example, no water repellent is present at the interface between the base external electrode layer and the plating layer in these multilayer ceramic capacitors. Accordingly, the joint strength between the base external electrode layer and the plating layer is significantly improved.

The concentration of glass in the base external electrode layer is preferably not less than about 30% by volume in these multilayer ceramic capacitors, for example. Accordingly, the joint strength between the ceramic body and the base external electrode layer is significantly improved.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A method of manufacturing a multilayer ceramic capacitor, the method comprising: producing a ceramic body including a stack of a dielectric layer and an internal electrode; applying a conductive paste including metal powder and glass frit to an outer surface of the ceramic body and baking the conductive paste to form a base external electrode layer; forming a crack in glass exposed to an outer surface of the base external electrode layer; after forming the crack, applying a water repellent to the base external electrode layer; forming at least one plating layer on the base external electrode layer, and the multilayer ceramic capacitor includes a region in which the water repellent is included at a depth of not less than about 30 nm from an outer surface of the base external electrode layer.

2. The method according to claim 1, wherein the water repellent includes F.

3. The method according to claim 1, wherein the forming the crack in the glass is performed by wet barrel finishing on the base external electrode layer.

4. The method according to claim 1, further comprising, after the applying the water repellent to the base external electrode layer, removing the water repellent on a surface of the base external electrode layer.

5. The method according to claim 1, further comprising, as a pretreatment of the forming of the at least one plating layer on the base external electrode layer, performing a hydrophilization treatment on the base external electrode layer and the ceramic body.

6. The method according to claim 1, wherein the water repellant is applied to an interior of the base electrode layer.

7. The method according to claim 1, further comprising forming a pore in the base external electrode layer before forming the crack in the glass.

8. The method according to claim 7, further comprising filling in the pore after the forming of the crack and before the applying the water repellant.

9. A multilayer ceramic capacitor comprising:
a ceramic body including a stack of a dielectric layer and an internal electrode; and
an external electrode provided on an outer surface of the ceramic body, the external electrode including:
a base external electrode layer provided on the outer surface of the ceramic body and including glass; and
at least one plating layer provided on the base external electrode layer; wherein
a water repellent is applied to the base external electrode layer; and
the multilayer ceramic capacitor includes a region in which the water repellent is included at a depth of not less than about 30 nm from an outer surface of the base external electrode layer.

10. The multilayer ceramic capacitor according to claim 9, wherein the water repellent includes F.

11. The multilayer ceramic capacitor according to claim 9, wherein
the glass is exposed to the outer surface of the base external electrode layer; and
a crack is provided in the glass exposed to the outer surface of the base external electrode layer.

12. The multilayer ceramic capacitor according to claim 11, wherein the water repellent is included on an internal surface of the crack.

13. The multilayer ceramic capacitor according to claim 9, wherein the water repellent is not included at an interface between the base external electrode layer and the at least one plating layer.

14. The multilayer ceramic capacitor according to claim 9, wherein a content percentage of the glass in the base external electrode layer is not less than about 30% by volume.

15. The multilayer ceramic capacitor according to claim 9, wherein the plating layer includes a Ni plating layer and a Sn plating layer.

16. The multilayer ceramic capacitor according to claim 6, wherein the base external electrode layer further includes a metal.

17. The multilayer ceramic capacitor according to claim 9, wherein a thickness of the base external electrode layer is between about 0.1 μm and about 15 μm.

18. A multilayer ceramic capacitor comprising:
a ceramic body including a stack of a dielectric layer and an internal electrode; and
an external electrode provided on an outer surface of the ceramic body, the external electrode including:
a base external electrode layer provided on the outer surface of the ceramic body and including glass; and
at least one plating layer provided on the base external electrode layer; wherein a water repellent is applied to the base external electrode layer; and the multilayer ceramic capacitor includes, in a region at a depth of not less than about 30 nm from an outer surface of the base external electrode layer, a region including not less than about 10% by area of a component of the water repellent relative to a sum of a component of the base external electrode layer and a component of the water repellent.

* * * * *